March 4, 1958 W. A. DOCKHORN 2,825,263
STEREOSCOPIC VIEWER FOR MOTION PICTURES
Filed Aug. 17, 1953

INVENTOR.
WAYNE A. DOCKHORN
BY John Ewbank
ATTORNEY

United States Patent Office 2,825,263
Patented Mar. 4, 1958

2,825,263

STEREOSCOPIC VIEWER FOR MOTION PICTURES

Wayne A. Dockhorn, Huntingdon Valley, Pa.

Application August 17, 1953, Serial No. 374,776

1 Claim. (Cl. 88—16.6)

This invention relates to stereoscopic viewing apparatus employing rotating disc shutter means. Reference is made to two copending applications, Ser. No. 374,777, now Patent No. 2,810,318, and Ser. No. 374,778, filed by the same inventor on related subject matter.

Heretofore, three dimensional movies have been projected by the use of polarized light and spectators have objected that the observation of such polarized three dimensional movies caused the eyes to be fatigued. It is an object of the present invention to provide a viewing apparatus for observing three dimensional movies or the like which produces a minimum amount of eye fatigue and eye strain for the spectator.

Heretofore, stereoscopic viewers employing rotating discs have been so heavy and cumbersome that they have been designed to be held on fixed standards, or on goose neck flexible cable supports, or have been designed to be held in the hand and placed before the eyes. All such methods of positioning the heavy cumbersome rotating disc viewers have been quite tiring to the spectator. It is an object of the present invention to provide a stereoscopic viewer which can be used without excessively tiring the spectator.

An important feature of the present invention is the provision of a rotating disc type of stereoscopic viewer having means thereon whereby the weight of the entire compact stereoscopic viewer is carried by the head of the spectator. In certain embodiments of the invention adjustable perimeter straps extend to the back of the spectator's head, so that both the front and the rear of the spectator's head are snugly clamped. In other embodiments of the invention, temple members extend from the sides of the housing to stabilizing zones adjacent the ears of the spectator and much of the weight of the compact stereoscopic viewer is supported by a nose rest near the center of the housing.

In previous stereoscopic viewers, it has been standard practice to position the rotating disc in a plane perpendicular to the center path of light toward the eyes. In certain embodiments of the present invention, advantageous results are obtained by disposing the housing and rotating disc at an angle relative to the perpendicular to the center path of the light toward the eyes. In certain embodiments of the present invention the housing is adapted to rest at an angle against the forehead of the spectator, thereby simplifying the means for carrying the rotating disc shutter device on the head of the spectator.

Heretofore, it has been standard practice in constructing rotating shutters to employ metal disc having cut out portions to provide transparent openings. In certain embodiments of the present invention a plastic disc is employed as the shutter, portions thereof being made opaque and other portions being made transparent.

Heretofore, there have been stereoscopic viewers which could be employed without the need for polarized light. By the use of such viewers the spectator would see a series of right eye view pictures and a series of left eye view pictures in such a manner as to impart a three dimensional effect. Some stereoscopic viewers have employed rotating disc shutters whereby light was transmitted through two light apertures (the window for the right eye and the window for the left eye) in accordance with some predetermined cycle.

Some of the previously available stereoscopic viewers employing rotating disc shutters have permitted both eyes to view simultaneously an illuminated screen during a portion of the operating cycle. Such simultaneous viewing of an illuminated screen has been objectionable in three dimensional movies. The operating cycle of some of the previously available stereoscopic viewers has provided for a significant period during which both of the light apertures were closed.

By providing short periods during which neither of the dual projectors illuminated the screen, that is by providing a blackout of the auditorium during the time when the viewers permitted dual transparency certain viewers have been useful.

However, viewers permitting dual transparency are not appropriate for stereoscopic television, in which long blackouts are not feasible. Three dimensional television is most effective when seen thru a viewer providing precisely alternate openings of the right and left eye windows, that is, providing substantially zero dual transparency and substantially zero dual opacity.

As explained in co-pending application Serial No. 347,777, filed by the same inventor, it has been discovered that it is possible to provide a rotating disc shutter means wherein there is no dual transparency and wherein there is also no dual opaqueness, but instead a true effective alternate obscuring of the two apertures. As explained in said co-pending application this highly desirable result may be achieved by the use of oppositely rotating discs each having segments alternately opaque and transparent. In all of the embodiments of the present invention there are rotating disc shutter means achieving the important advantage of effective alternate obscuring, that is the operation of the shutter for the two apertures in such a way as to substantially eliminate dual transparency and dual opaqueness. In some embodiments of the present invention oppositely rotating discs of the type described in said copending application are employed. In other embodiments of the invention a single rotating disc having special and unique properties is employed to achieve this result.

In previous proposals for rotating disc stereoscopic viewers operated by electric motors, it has been customary either to use a gear drive from a radially positioned motor or to use a motor positioned essentially at the axis of the disc. In certain embodiments of the present invention a circumferential motor having both the armature and field coils positioned at the circumference of a rotating disc are provided.

In the drawings Figure 1 is a perspective view of one of the embodiments of the invention.

Figure 1:
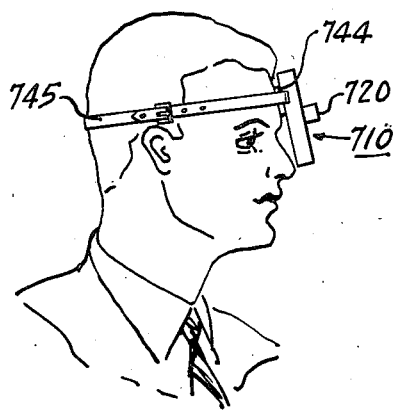
Figure 2:
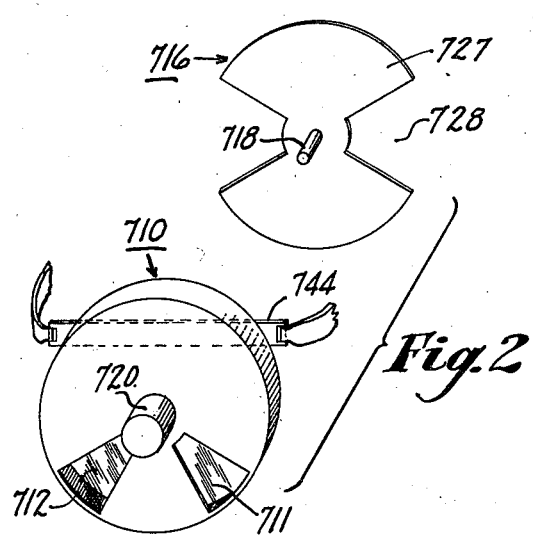
Figure 2 is an exploded view of a portion of the apparatus shown in Figure 1.

In Figures 1 and 2 there is shown a viewer having a housing 710 constructed of an opaque material having windows 711 and 712 for the left and right eyes respectively. Each of these windows constitutes substantially a 30° segment, separated by a 60° opaque segment. A motor 720 is mounted at the center of the housing and drives a disc 716 mounted on the motor axle 718. The disc 716 includes a transparent segment 728 of 60° and an opaque segment 727 of 120°, that is, twice as large. Because the transparent segment 728 is 60° and equal to the opaque portions between the windows 711 and 712, the rotation of the disc 716 provides effective alternate obscuring of the windows 711 and 712. Thus the opening of the windows 711 begins an instant (e. g. within about 1° of the rotation of the disc) after the complete closing of the window 712 and vice versa. By reason of the effective alternate obscuring of the right and left eye windows, this single disc shutter mechanism is suitable for viewing stereoscopic television and possesses certain advantages in the viewing of three dimensional movies.

The housing 710 may be carried on the head of the spectator by means of an adjustable strap 745 extending around the rear of the spectator's head and cooperating with the forehead member 744 secured to the housing.

Figure 3:
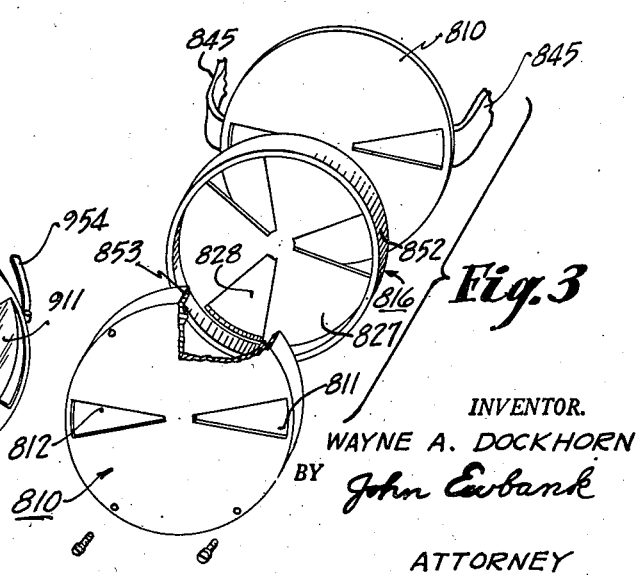
Figure 3 is an exploded view of another embodiment of the invention.

The viewer shown in Figure 3 is characterized by a circumferential motor comprising a circumferential armature 852 magnetically actuated by circumferential field coils 853. The opaque housing 810 has left and right eye transparent windows 811 and 812 in diametrically opposite positions. Each of the windows constitutes a 20° segment. The disc 816, on which the circumferential armature 852 is positioned, includes opaque segments 827 and transparent segments 828. Each transparent segment 828 subtends an angle of 40°, that is twice the angle each of the windows 811 and 812. The opaque segment 827 subtends an angle of 80°, that is, twice that of the transparent segment 828 or four times that of the windows 811 and 812. As a result of these relationships, the rotation of the disc 816 effectively alternately obscures the windows 811 and 812, thereby providing a viewer suitable for observing three dimensional television. The viewing apparatus of Figure 3 can be positioned on the spectator's head by means of a strap 845 extending from the housing around the back of the spectator's head.

Figure 4:
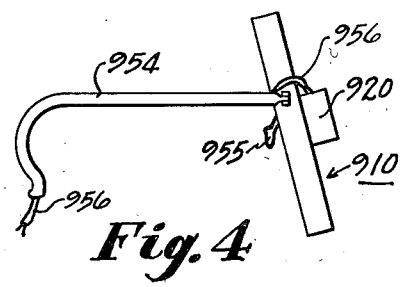
Figure 4 is a side plan view of the preferred embodiment of the invention.
Figure 5:
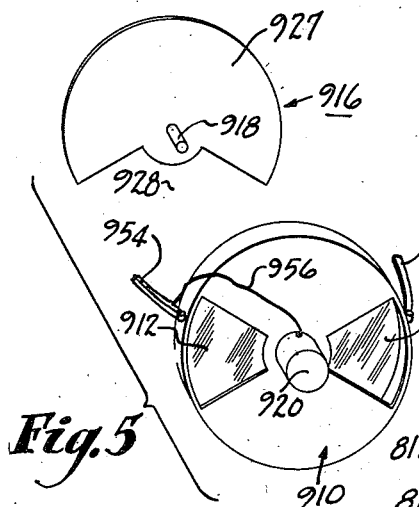
Figure 5 is an exploded view of a portion of the preferred embodiment shown in Figure 4.

In the preferred embodiment shown in Figures 4 and 5, an opaque housing 910 is provided with a left and right eye light apertures 911 and 912 respectively. Each of these windows 911 and 912 constitutes a segment of 60°, and the light apertures are positioned diametrically opposite from each other. A rotating disc 916 has a 240° opaque segment 927 and a 120° transparent segment 928. It will be noted that the angle subtended by the transparent segment 928 is twice that of the windows 911 and 912 and one half that of the opaque segment 927. The disc 916 is rotated by the motor 920 thru the axle 918. Both the upper and lower stationary masks between the light apertures 911 and 912 are segments subtending 120° exactly equal to the transparent section 928. Hence, rotation of the disc provides effective alternate obscuring of the spectator's eyes.

The housing 910 may be positioned on the head of the spectator and movable therewith. It is desirable to provide temple members 954 extending from the housing 910 back against the temples of the spectator and adjacent the ears of the spectator. The housing 910 also includes a nose rest 955 which cooperates with the temple members in positioning the housing 910 forwardly of the eyes of the spectator. A wire 956 extends from a source of alternating electric current thru the temple member to the motor 920.

Figure 6:
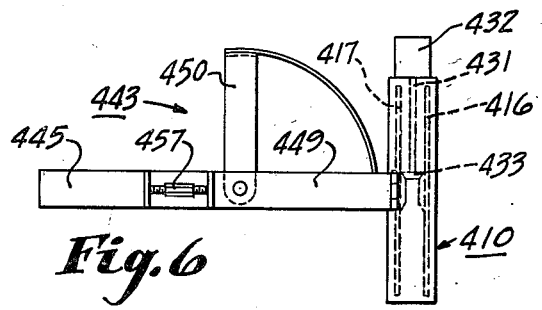
Figure 6 is a side view of still another embodiment of the invention.

In that form of the invention shown in Figure 6, a housing 410 encloses two oppositely rotating discs 416 and 417, rotated by motor 432 thru a drive shaft 431 and gears 433. The housing 410 is positioned forwardly of the eyes of the spectator by means of a headpiece 443 which includes a rear strap 445, a crown member 450 and braces 449. The head piece 443 can be made adjustable for heads of various sizes, by means of a turn buckle 457.

It will be noted that in each of the single disc shutter devices of Figures 1–5 the opaque portion of the rotating disc is twice that of the transparent section which in turn is just twice that the angle subtended by the windows for the left and right eyes.

It will also be noted that those forms of the invention employing a single disc shown in Figures 1, 2, 4 and 5, the opaque portion between the windows is substantially exactly equal to the transparent segment of the rotating disc.

By reason of the very light weight of the apparatus it is carried by the spectator's head and positioned on the head by supports extending from the housing and against the head of the spectator.

In the operation of any of these viewers it is essential that there be a synchronization of the viewing mechanism and the projecting mechanism. If desired the projection apparatus can provide, not only the control over the alternating electric current operating the synchronous motor at the same speed as the speed of operation of the corresponding parts of the projector, but it can also provide a synchronizing signal to automatically maintain the rotating disc exactly in step with the projecting apparatus. The motor desirably comprises phase-alignment means responsive to the periodic synchronizing signal transmitted by wire from the projector to the motor.

If desired, the exactly alternate obscuring of the right and left eye windows can be achieved by the use of 90° windows separated by 90° opaque segment in which case the transparent section of the rotating disc is equal to the opaque segment between the windows, that is 90°.

I claim:

A stereosopic viewing apparatus comprising: a housing having a light aperture for the spectator's right eye and a light aperture for the spectator's left eye, each aperture constituting an approximately 60° segment positioned diametricaly opposite each other; a rotating disc comprising an opaque section of approximately 240° and a transparent section of approximately 120°; a motor rotating the disc whereby the shutter effectively obscures alternately the two apertures; a support extending from the housing to rest on the spectator's nose; temple members extending from the housing to a stabilizing zone adjacent each ear of the spectator; an electrical conduit in a temple member, whereby the electrical wiring from the motor passes through the temple member to a point adjacent to an ear of the spectator; supports connecting the housing and temple members to position the rotating shutter and housing forwardly of the eyes of the spectator at an angle significantly removed from the perpendicular to the center path thru the light apertures.

References Cited in the file of this patent

UNITED STATES PATENTS

| | | |
|---|---|---|
| 1,820,357 | Lindstrom et al. | Aug. 25, 1931 |
| 2,273,512 | Caldwell et al. | Feb. 17, 1942 |
| 2,362,030 | Seemann | Nov. 7, 1944 |
| 2,365,212 | Oriol | Dec. 19, 1944 |
| 2,384,260 | Goldsmith | Sept. 4, 1945 |

FOREIGN PATENTS

| | | |
|---|---|---|
| 470,821 | Germany | Jan. 28, 1929 |
| 444,839 | Great Britain | Mar. 30, 1936 |
| 884,105 | France | Apr. 12, 1943 |